(12) United States Patent
Krasner et al.

(10) Patent No.: US 11,347,552 B2
(45) Date of Patent: May 31, 2022

(54) RESOURCE MONITORING AND ALLOCATION USING PROPORTIONAL-INTEGRAL-DERIVATIVE CONTROLLERS

(71) Applicant: EMC IP Holding Company LLC, Hopkinton, MA (US)

(72) Inventors: Jonathan I. Krasner, Coventry, RI (US); Chakib Ouarraoui, Watertown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 16/887,196

(22) Filed: May 29, 2020

(65) Prior Publication Data

US 2021/0373956 A1     Dec. 2, 2021

(51) Int. Cl.
*G06F 9/50*        (2006.01)
*G05B 11/42*       (2006.01)
*G06F 9/455*       (2018.01)
*G06F 11/30*       (2006.01)

(52) U.S. Cl.
CPC ........... *G06F 9/5016* (2013.01); *G05B 11/42* (2013.01); *G06F 9/455* (2013.01); *G06F 9/5027* (2013.01); *G06F 11/3051* (2013.01); *G06F 2209/5011* (2013.01)

(58) Field of Classification Search
CPC .. G06F 9/5016; G06F 9/5027; G06F 11/3051; G06F 9/455; G06F 2209/5011; G05B 11/42
See application file for complete search history.

(56) References Cited

U.S. PATENT DOCUMENTS

| | | | |
|---|---|---|---|
| 7,228,546 B1 * | 6/2007 | McCarthy | G06F 9/5061 718/103 |
| 7,676,578 B1 * | 3/2010 | Zhu | G06F 11/3447 709/226 |

(Continued)

OTHER PUBLICATIONS

Jon I. Krasner, "Setting Core Allocations," U.S. Appl. No. 16/527,697, filed Jul. 31, 2019.

(Continued)

*Primary Examiner* — Benjamin C Wu
(74) *Attorney, Agent, or Firm* — Muirhead and Saturnelli, LLC

(57) ABSTRACT

Techniques for allocating resources in a system may include: monitoring, using a first proportional-integral-derivative (PID) controller, a size of a pool of free shared resources of a first type; responsive to determining the size of the pool of the free shared resources is at least a minimum threshold, providing the size of the pool of free shared resources as an input to a second PID controller; monitoring, using the second PID controller, a total amount of resources of the first type that are available; determining, using the second PID controller and in accordance with one or more resource policies for one or more applications, a deallocation rate or amount; deallocating, using the second PID controller and in accordance with the deallocation rate or amount, resources of the first type; and allocating a least a first of the deallocated resources for use by one of the applications.

22 Claims, 12 Drawing Sheets

(56) References Cited

U.S. PATENT DOCUMENTS

| | | | |
|---|---|---|---|
| 8,681,969 B1* | 3/2014 | Rodde | H04L 65/80 348/14.02 |
| 2011/0113200 A1* | 5/2011 | Moses | G06F 12/0888 711/170 |
| 2017/0222905 A1* | 8/2017 | Leroux | H04L 43/0876 |
| 2019/0041967 A1* | 2/2019 | Ananthakrishnan | G06F 9/4893 |
| 2020/0065150 A1* | 2/2020 | Wang | G06F 9/4881 |

OTHER PUBLICATIONS

Wikipedia, "PID controller," May 26, 2020, https://en.wikipedia.org/wiki/PID_controller.

* cited by examiner

| Resource policies 910 | | | |
|---|---|---|---|
| Application or Service 912 | Service Level and priority 914 | Workload 916 | CPU requirements 918 |
| A | Diamond priority 1 | Below A1<br>A1-A2<br>Above A2 | 1<br>2<br>3 |
| B | Silver /priority 4 | N/A | 1 |
| C | Bronze/priority 5 | N/A | 40% |
| .. | .. | .. | .. |

FIG. 10

RESOURCE MONITORING AND ALLOCATION USING PROPORTIONAL-INTEGRAL-DERIVATIVE CONTROLLERS

BACKGROUND

Technical Field

This application generally relates to resource allocation.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for allocating resources in a system comprising: monitoring, using a first proportional-integral-derivative (PID) controller, a size of a pool of free shared resources of a first type; responsive to determining that the size of the pool of the free shared resources of the first type is greater than or equal to a minimum threshold, providing the size of the pool of free shared resources as an input to a second PID controller; monitoring, using the second PID controller, a total amount of resources of the first type that are available; determining, using the second PID controller and in accordance with one or more resource policies for one or more applications, a deallocation rate or amount for resources of the first type; deallocating, using the second PID controller and in accordance with the deallocation rate or amount, one or more resources of the first type; and allocating a least a first of the one or more resources for use by a first of the one or more applications.

In at least one embodiment, the system may be a data storage system. The first type of resources may be memory. The first type of resources may be CPU resources. The pool of free shared CPU resources may denote CPU resources of a single board that are available for use by any application executing on a CPU of the single board. The total amount of resources of the first type that are available may denote a total amount of CPU resources on the single board that are available. The total amount of CPU resources that are available may include first CPU resources of the pool of free shared CPU resources and may include second CPU resources that are allocated for dedicated use by one or more applications executing on one or more CPUs of the single board.

In at least one embodiment, a data storage system may include: a plurality of director boards, wherein each of the plurality of director boards includes a plurality of CPUs configured as a plurality of adapters; a memory coupled to the plurality of director boards; a computer readable medium comprising code stored thereon that, when executed, performs a method of allocating resources in the data storage system comprising: monitoring, using a first proportional-integral-derivative (PID) controller, a size of a pool of free shared CPU resources on a first of the plurality of director boards; responsive to determining that the size of the pool of the free shared CPU resources of the first director board is greater than or equal to a minimum threshold, providing the size of the pool of free shared CPU resources of the first director board as an input to a second PID controller; monitoring, using the second PID controller, a total amount of CPU resources of the first board that are available; determining, using the second PID controller and in accordance with one or more resource policies for one or more applications, a deallocation rate or amount for CPU resources of the first director board; deallocating, using the second PID controller and in accordance with the deallocation rate or amount, one or more CPU resources of the first director board; and allocating a least a first of the one or more CPU resources of the first director board for use by a first of the one or more applications.

In at least one embodiment, the plurality of adapters may include a host adapter that exchanges data with one or more hosts connected to the data storage system. The plurality of adapters may include a disk adapter that exchanges data with one or more physical storage devices. The plurality of adapters may include a remote adapter that exchanges data with one or more remote data storage systems. Each of the plurality of adapters of each director board may be emulated using code that executes on one or more processors of one or more CPU resources of the director board.

BRIEF DESCRIPTION OF THE DRAWINGS

Features and advantages of the present invention will become more apparent from the following detailed description of illustrative embodiments thereof taken in conjunction with the accompanying drawings in which:

FIG. 10 is an example of resource policies that may be used in an embodiment in accordance with the techniques herein.

FIG. 11 is a flowchart of processing steps that may be performed in an embodiment in accordance with the techniques herein.

DETAILED DESCRIPTION OF EMBODIMENTS

A storage system may have a plurality of physically discrete computing modules (hereinafter "computing modules") interconnected by an internal switching fabric of the storage system. For example, a computing module may be a director board of a PowerMax™ data storage system made available from Dell EMC. Each computing module may have its own dedicated local memory and a global memory (GM) segment that is a portion of a distributed GM shared by multiple (e.g., all) computing modules. Each computing module may include one or more central processing units (CPUs). In at least one embodiment, each of the CPUs may be a multi-core CPU including multiple processing cores or processors. The individual cores or processors within a single CPU can execute multiple instruction streams in parallel thereby increasing the performance of software which has been written to take advantage of the unique architecture. In at least one embodiment, one or more of the CPUs may be configured (e.g., hardwired, hardcoded or programmed) as a functional component of a storage system, for example, a front-end adapter (FA) or back-end adapter (BE) as described in more detail herein, or as some other functional component, for example, a data services component (DS) responsible for one or more data services, e.g., memory management for I/O operations.

Figure 1:
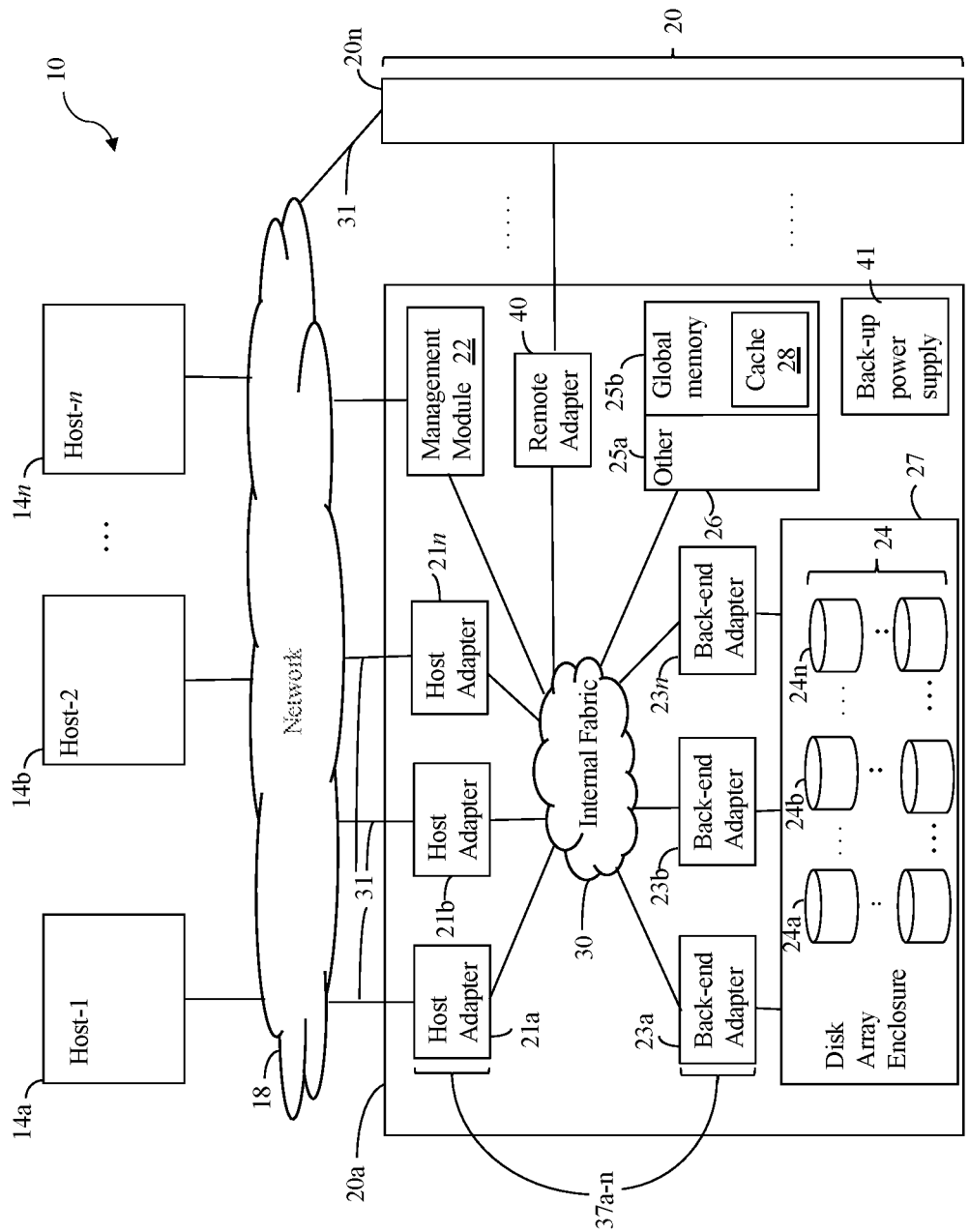
FIG. 1 is a block diagram illustrating an example of a data storage network in an embodiment in accordance with the techniques herein.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. The BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also may be referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication and data exchanges between storage systems (e.g., 20a and 20n), such as between two of the same or different types of storage systems, and/or may be implemented using a director.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs (command line interfaces), APIs (application programming interfaces), and the like, to enable management. In some embodiments, the management module, or portions thereof, may be located external to storage system 20a, for example, as part of one of host systems 14a-n or another separate system connected to the storage system 20a via the network 18.

The FAs, BEs and RAs may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEs 23a-n, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BE.

It should be noted that, although examples of techniques herein may be made with respect to a physical storage system and its physical components (e.g., physical hardware for each RA, BE, FA and the like), the techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin or virtually provisioned device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

Figure 2A:
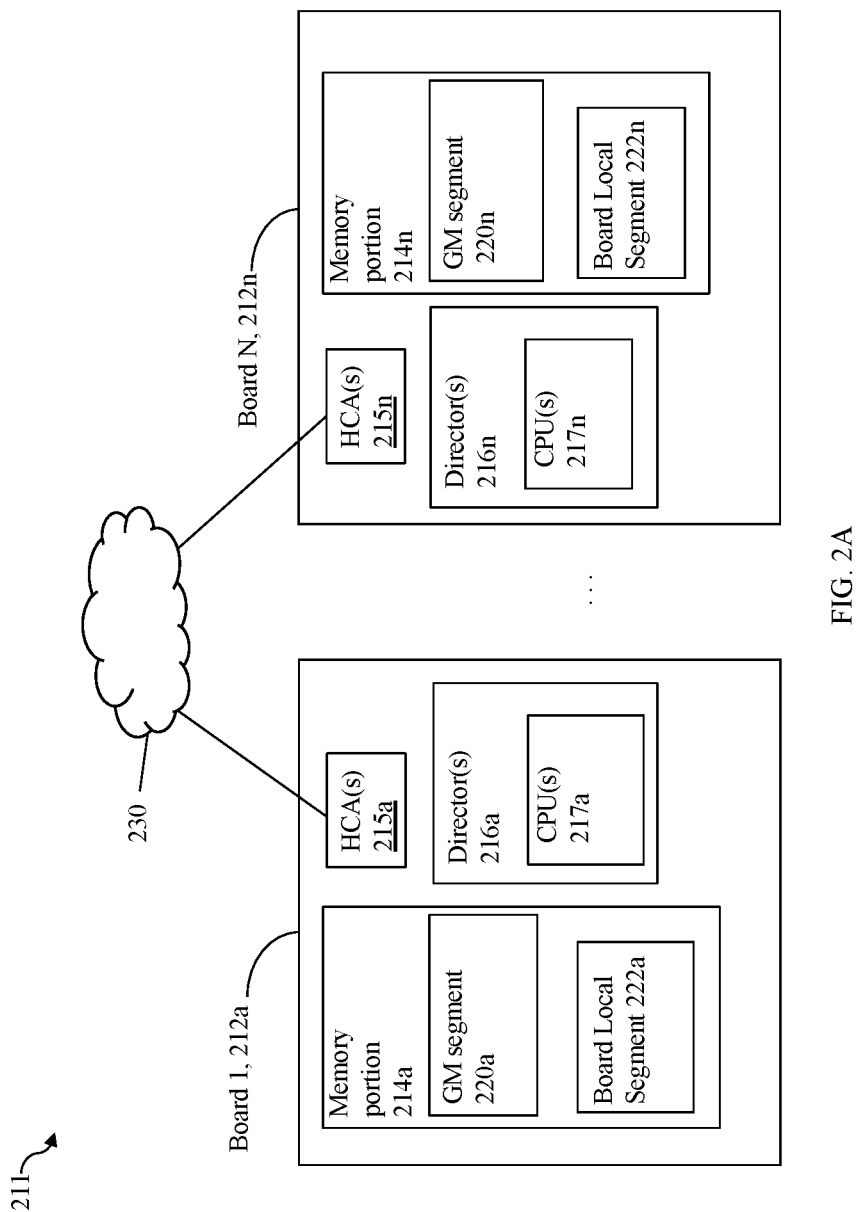
FIG. 2A is a block diagram illustrating an example of a storage system including multiple circuit boards in an embodiment in accordance with the techniques herein.

FIG. 2A is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more CPUs 217a including compute resources, for example, one or more cores or processing units and/or a CPU complex for processing I/O operations. One or more of the CPUs may be configured to function as one of the directors 37a-n described herein. For example, element 216a of board 212a may be configured to operate, such as by executing code, as any one or more of an FA, BE, RA, and the like. In at least one embodiment, each of the directors may include a multicore CPU.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with techniques herein, each of the board local segments 222a-n may include a local page table or page directory used, respectively, by only director(s) 216a-n local to each of the boards 212a-n.

In such an embodiment as in FIG. 2A, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 2B:
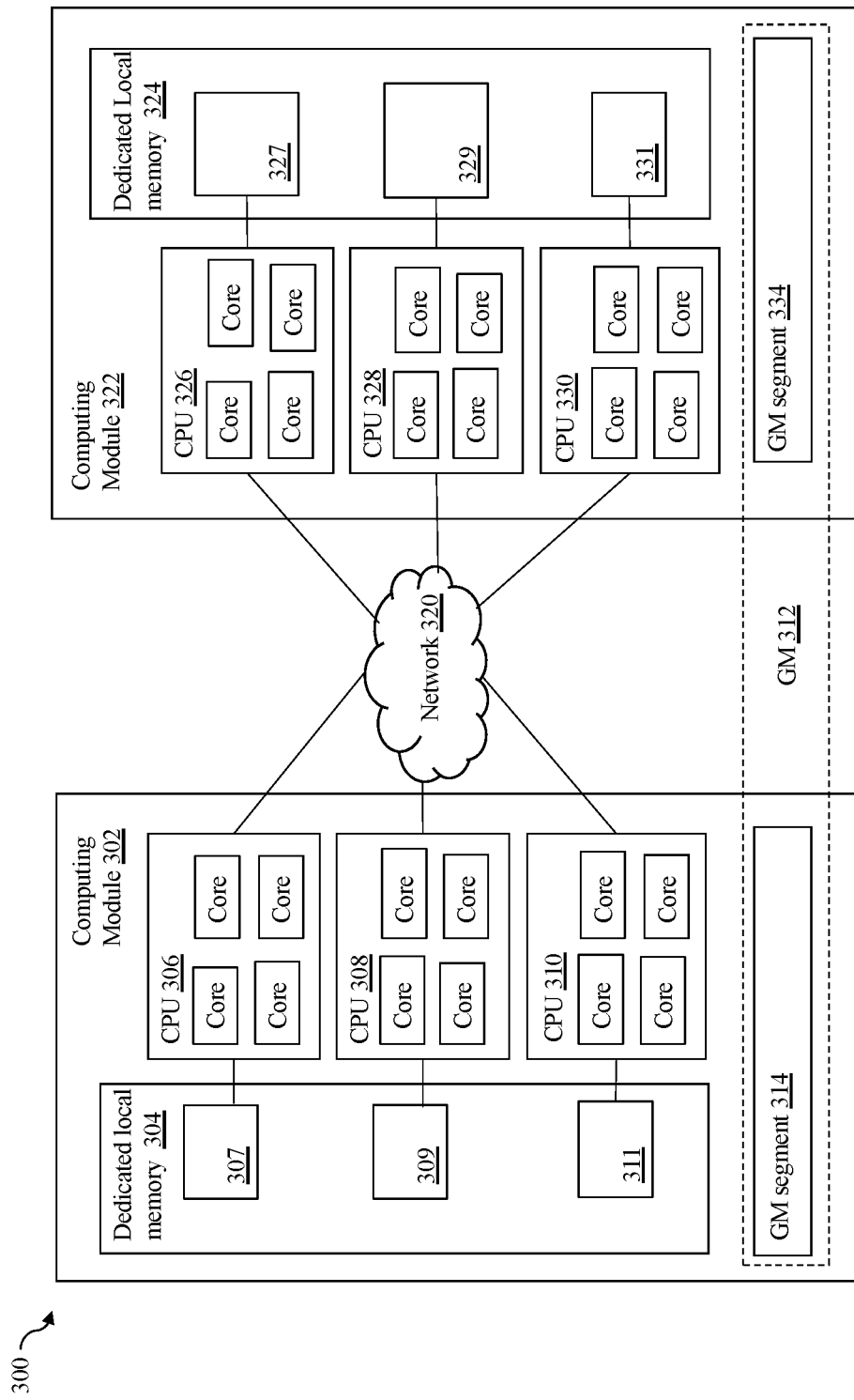
FIG. 2B is a block diagram illustrating an example of a storage system including multiple computing modules and processing cores in an embodiment in accordance with the techniques herein.

FIG. 2B is a block diagram illustrating an example of a storage system 300 including multiple computing modules and CPUs in an embodiment in accordance with the techniques herein. Other embodiments of a storage system including multiple computing modules and CPUs, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

Figure 3:
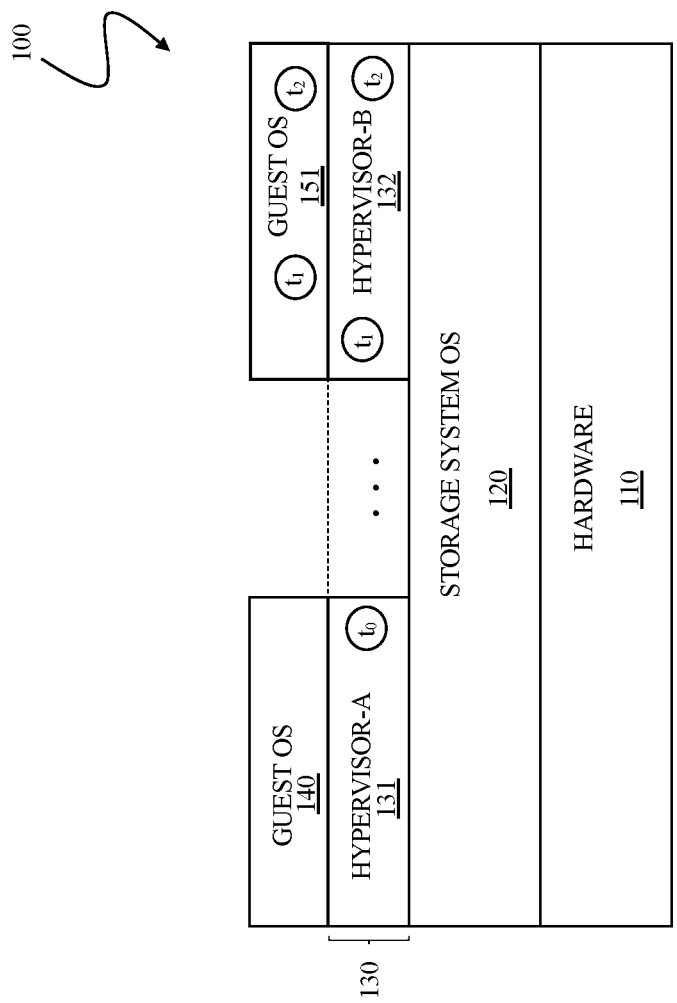
FIG. 3 is a schematic illustration showing hardware and software layers for a storage system, including independent hypervisors as threads, according to an embodiment of the system described herein.

The storage system 300 may include multiple computing modules, including computing modules 302 and 322. It should be appreciated that the storage system may include more than two computing modules. Each of computing modules 302 and 322 may be a director board of a Power-Max system made available from Dell EMC. Each of the computing modules 302 and 322 may include generally one or more CPUs, where each CPU may be a single core or multi-core CPU. For example, the computing module 302 may include the CPUs 306, 308 and 310; and the computing module 322 may include the CPUs 326, 328 and 330. Each CPU may generally include one or more processing units or cores, each of which may be capable of processing a separate instruction stream. As a variation and as illustrated in the embodiment of FIG. 2B, for example, each CPU may include a plurality of processing cores, including a number other than four as illustrated in FIG. 3. In at least one embodiment, each of the CPUs 306, 308, 310, 326, 328 and 330 may be configured (e.g., hardwired, hardcoded or programmed) as a functional component of a storage system, for example, an FA, BE or DS. More generally, one or more of the CPUs 306, 308, 310, 326, 328 and 330 may be configured (e.g., hardwired, hardcoded or programmed) as a functional component of a storage system, for example, an FA, BE or DS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2A. Further each of the CPUs 306, 308 and 310 may be allocated a portion of the local memory 304 for exclusive or private use by the single CPU. For example, the memory portions 307, 309 and 311 may be configured for exclusive or private use, respectively, by the CPUs 306, 308 and 310; and the memory portions 327, 329 and 331 may be configured for exclusive or private use, respectively, by the CPUs 326, 328 and 330.

In at least one embodiment in accordance with the techniques herein, some or all of a local memory portion designated for exclusive private use by a single CPU may be used as a local cache by the CPU. For example, the memory portion 307 may denote a portion of the dedicated local memory 304 designated as a local or private cache of the CPU 306, the memory portion 309 may denote a portion of the dedicated local memory 304 designated as a local or private cache of the CPU 308, and the memory portion 311 may denote a portion of the dedicated local memory 304 designated as a local or private cache of the CPU 310. Additionally, the memory portion 327 may denote a portion of the dedicated local memory 324 designated as a local or private cache of the CPU 326, the memory portion 329 may denote a portion of the dedicated local memory 324 designated as a local or private cache of the CPU 328, and the memory portion 331 may denote a portion of the dedicated local memory 324 designated as a local or private cache of the CPU 330.

The memory portions denoting the CPU local or private caches 307, 309, 311, 327, 329 and 331 may be configured to store values or data items used solely be each associated CPU.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each CPU may include multiple processing units or cores and multiple processes may be executing simultaneously on the processing units or cores of the single CPU, processing may be performed to synchronize access to the CPU's local or private resources among the different cores of the single CPU using such resources. For example, in at least one embodiment as described above and illustrated in the FIG. 2B, each CPU may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple cores or processing units in a single CPU. For example, a synchronization technique may be used to synchronize access to locations of the private cache 307 used by the multiple cores of the CPU 306; a synchronization technique may be used to synchronize access to locations of the private cache 309 used by the multiple cores of the CPU 308; and so on, for each of the other multicore CPUs 310, 326, 328 and 330.

As a variation, each CPU 306, 308, 310, 326, 328, 330 may rather be characterized as a processor rather than a multi-core CPU. In this case in which the CPU is rather a single processor or processing unit, there is no contention for locally used resources among multiple cores of the same CPU. In the embodiment in which the CPU is a single core or processing unit, no synchronization technique or mechanism is necessary when accessing, for example, the portions of the private cache of a single CPU. For example, if 306 denotes only a single core or processing unit CPU, then no synchronization technique or mechanism is necessary when accessing, for example, the portions of the private cache or memory 307 used exclusively by the single CPU 306.

Although not explicitly illustrated in FIG. 2B, those CPUs configured as FAs also have the necessary front end interfaces to the network, such as the network 18 of FIG. 1, to communication with external clients such as the hosts. Also, although not explicitly illustrated in FIG. 2B, those CPUs configured as BEs also have the necessary backend interfaces, such as interfaces to the various backend non-volatile physical storage devices (PDs) 24 of FIG. 1, to read data from, and write data to, such PDs.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management commands to and/or from a data storage system, and also receiving responses (possibly including requested data) to such control or management commands. For example, with reference to the FIG. 1, the control commands may be issued from data storage management software, such as the management module 22, or from a data storage system management application executing on a management system, such as another computer system or other device with a processor that is connected to the data storage system 12. Such commands may be, for example, to establish or modify data services; view performance or health of various system components and storage entities; provision storage; perform user account management; provision storage; create, modify or delete a logical storage entity; and the like. For example, commands may be issued over the control path to provision storage for LUNs; create a storage group (SG) which is a logically defined group of one or more LUNs; modify an existing SG such as by adding or removing LUNs; create a snapshot; define conditions of when to create another snapshot; define or establish local and/or remote replication services; define or modify a schedule for snapshot or other data replication services; create or configure a new RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Referring to FIG. 3, a schematic illustration showing hardware and software layers for a storage system 100, such as the storage systems 20a-n discussed elsewhere herein. The storage system 100 has independent hypervisors as threads, which are described in more detail elsewhere herein. A hardware layer 110 includes hardware components for the storage system 100, such as memory and processors (CPUs) and/or other components like that discussed in connection with FIGS. 1, 2A and 2B. A storage system operating system (OS) layer 120 is shown as the operating system for the storage system 100. In an embodiment, the OS layer 120 may be a Symmetrix storage system OS, such as Enginuity, with a Symm/K kernel that provides OS services and scheduling. Other operating systems may be used, such as the Linux operating system.

An instance is a single binary image of an OS that performs a specific set of operations. In an embodiment, there may be up to eight instances configured on a director board at any given time. A thread is a separately schedulable set of code or process of an instance. Threads may be co-operative and/or preemptive, and may be scheduled by the OS. An instance may run on more than one core, that is, an instance may provide a symmetric multiprocessing (SMP) environment to threads running within the instance.

According to at least one embodiment of the system described herein, a thread may be provided that runs as a hypervisor within the storage system OS environment. Consistent with other discussion herein, a hypervisor is a software implementation providing a software virtualization environment in which other software may run with the appearance of having full access to the underlying system hardware, but in which such access is actually under the complete control of the hypervisor. The hypervisor running as the OS thread is a container hypervisor. The container hypervisor may manage a virtual hardware environment for a guest operating system (Guest OS), and, in an embodiment, the container hypervisor may run multiple OS threads (e.g., 1 to N threads) within a single instance. The Guest OS is an operating system that may be loaded by a thread of the container hypervisor, and runs in the virtual environment provided by the container hypervisor. The Guest OS may also access real hardware devices attached to a director board using a virtual device provided by the container hypervisor or via a peripheral component interconnect (PCI) pass-through device/driver. There may be multiple container hypervisors running within a single instance at the same time. There may also be multiple container hypervisors running within different instances on the same director board at the same time.

In FIG. 3, a hypervisor layer 130 is shown as including hypervisor-A 131 and hypervisor-B 132 that may be examples of container hypervisors in accordance with the system described herein. Each of the container hypervisors 131, 132 may run as threads embedded within the storage system OS operating environment (the storage system OS 120). The container hypervisor 131 is shown running as a thread t0 and may be running independently of the container hypervisor 132. The container hypervisor 132 is shown running two threads t1 and t2. These threads may run independently of each other as well as the thread t0 of the container hypervisor 131. In each case, the threads t0, t1 and t2 of the container hypervisors 131, 132 may run as threads of one or more instances of the storage system OS 120. For example, in an embodiment, the container hypervisors 131, 132 may be threads running as part of an Enginuity instance or a Linux instance. The container hypervisors 131, 132 may be scheduled like any other thread and may be preempted and interrupted as well as started and stopped. Advantageously, since the container hypervisors 131, 132 runs as threads within the storage system OS environment, physical resource sharing of the underlying hardware is already provided for according to the storage system OS scheduling.

According to an embodiment of the system described herein, a Guest OS 140 is loaded using the thread t0 of the container hypervisor-A 131 and, for example, runs an application in the virtual environment provided thereby. As shown, a Guest OS 151 may be loaded using independent threads t1, t2 of the container hypervisor 132. As further discussed elsewhere herein, threads t0, t1 and t2 may all be run independently of each other. The ability to run a container hypervisor as a storage system OS thread provides that the storage system 100 may run with no performance penalty until the container hypervisor thread is enabled. Even when the hypervisor thread is enabled and running an application in a Guest OS, the performance impact may be controlled. Additionally, developments in physical hardware may be accommodated through a software development process that is decoupled from modifications to the hypervisor code. Accordingly, releases of new storage system code, hypervisor code and Guest OS, and applications code may all be realized in an independent manner.

In various embodiments, the container hypervisors 131, 132 may each provide for one or more of the following features: boot a Guest OS; run the Guest OS as a storage system OS thread (e.g., Symm/K); be scheduled, preemptable, etc.; reset the Guest OS without restarting the instance; allow the Guest OS to access storage systems (e.g., Symmetrix) using a Cut-through Device (CTD); and allow the Guest OS to access the I/O Modules using a PCI pass-through device.

Figure 4:
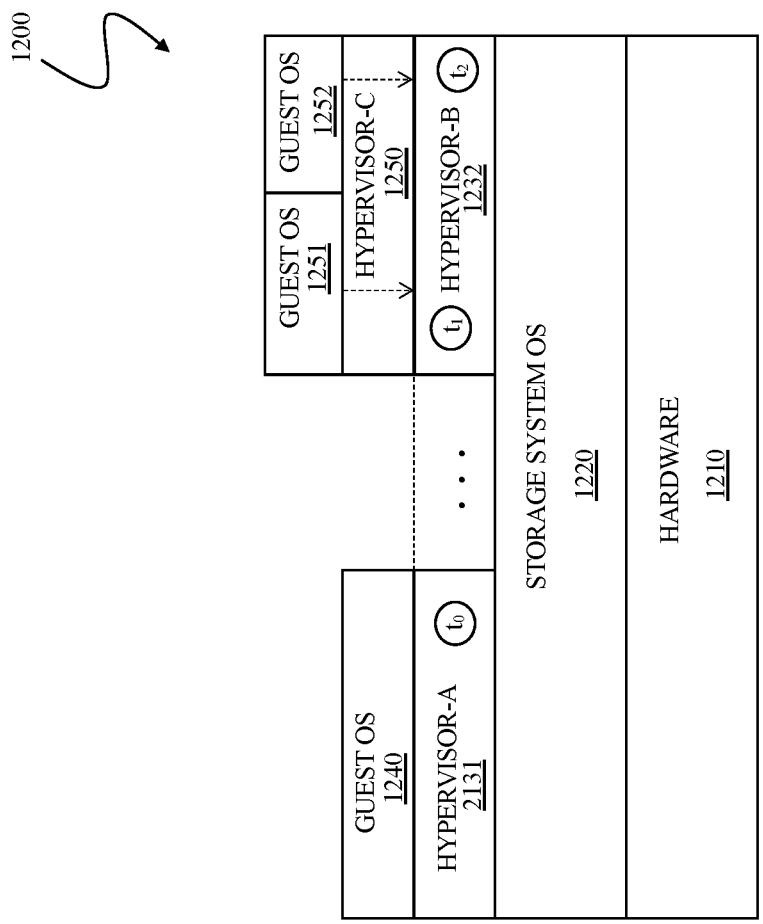
FIG. 4 is a schematic illustration showing a storage system with nested hypervisors according to another embodiment of the system described herein.

Referring to FIG. 4, a schematic illustration shows a storage system 1200 with nested hypervisors. The storage system 1200 is similar to the storage system 100 discussed elsewhere herein which may include a hardware layer 1210 and a storage system OS layer 1220. A Guest OS 1240 may be loaded using the thread t0 of a container hypervisor (hypervisor-A) 1231. As shown in connection with a container hypervisor (hypervisor-B) 1232, the container hypervisor 1232 may host one or more other hypervisors (hypervisor-C 1250). In various embodiments, the hypervisor-C 1250 may be another container hypervisor and/or may be another type of hypervisor, such as an ESXi hypervisor from VMware, Inc. of Palo Alto, Calif. The ability to host another hypervisor (hypervisor-C 250), as a nested hypervisor, provides the capability of the system 1200 to host any guest operating system, such as Guest OS's 1251, 1252 (e.g., Linux) that may be hosted by the hypervisor 1250 (e.g., ESXi) itself without needing to modify the code of the container hypervisor 1232. It is noted that additional layers of hypervisors may further be nested in accordance with the system described herein. By embedding hypervisors within hypervisors in a storage system environment in the manner according to the system described herein, physical resource sharing may be provided using the storage system OS scheduling and, thereby, resource trampling that may occur with the addition of another hypervisor, without such system OS scheduling, is avoided.

Figure 5:
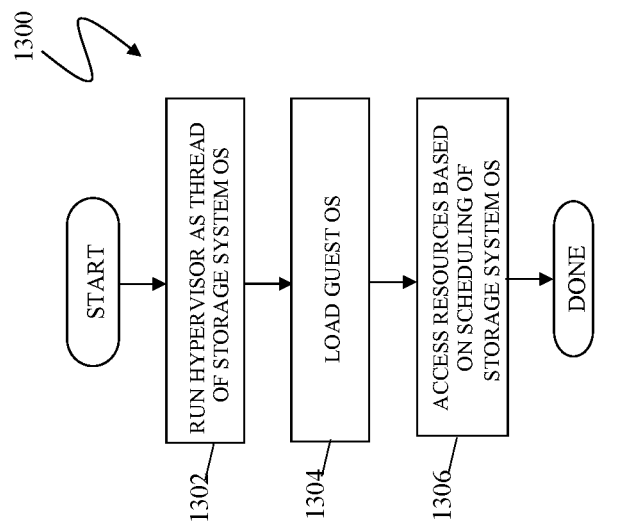
FIGS. 5, 6 and 11 are flowcharts of processing steps that may be performed in an embodiment in accordance with the techniques herein.

Referring to FIG. 5, a flow diagram 1300 shows processing for operating a hypervisor and a Guest OS according to various embodiments of the system described herein. At a step 1302, a container hypervisor is run as a thread of an underlying OS, for example, a storage system OS, such as Enginuity with Symm/K operating a Symmetrix storage system or the Linux operating system. After the step 1302, processing proceeds to a step 1304 where a Guest OS is loaded using the container hypervisor based on the thread of the storage system OS. The container hypervisor may be run independently of the Guest OS and independently of other hypervisors running as other threads of the storage system OS. After the step 1304, processing proceeds to a step 1306 where the hypervisor accesses resources according to a scheduler of the storage system OS and in connection with resource requirements of the Guest OS (and/or an application of the Guest OS). As further discussed elsewhere herein, the hypervisor may share resources with the other hypervisors according to the scheduling of the storage system OS. In an embodiment, the container hypervisor may be embedded with the storage system OS. As further discussed elsewhere herein, code of container hypervisor may be modified independently of code of the Guest OS and/or code of other hypervisors running as threads of the storage system OS. After the step 1306, processing is complete. One or more of the above-noted processing steps may be implemented via executable code stored on a non-transitory computer readable medium and executable by at least one processor according to an embodiment of the system described herein.

Figure 6:
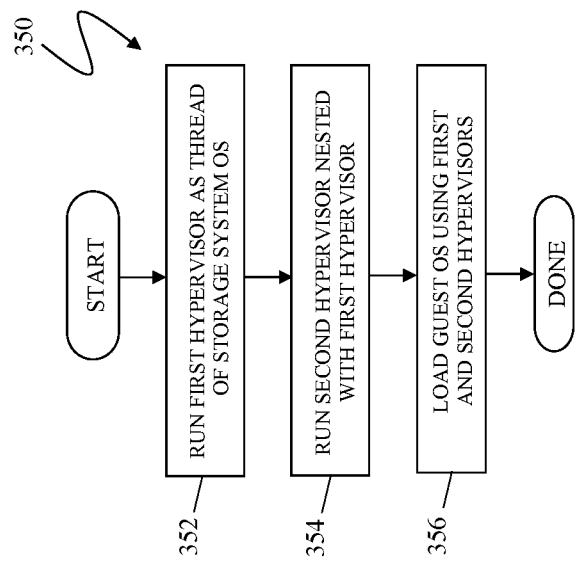

Referring to FIG. 6, a flow diagram 350 shows processing for operating nested hypervisors according to an embodiment of the system described herein. At a step 352, a container hypervisor (e.g., a first hypervisor) is run as a thread of an underlying OS, for example, a storage system OS, such as Enginuity with Symm/K operating a Symmetrix storage system. After the step 352, processing proceeds to a step 354, where a second hypervisor is run nested, and/or embedded within, the first hypervisor (the container hypervisor). In various embodiments, the second hypervisor may be a known hypervisor (e.g., ESXi) and/or may be another container hypervisor. Other hypervisors may be further nested in accordance with the system described herein. After the step 354, processing proceeds to a step 356, where a Guest OS is loaded using the first (container) hypervisor and the second hypervisor. After the step 356, processing is complete. One or more of the above-noted processing steps may be implemented via executable code stored on a non-transitory computer readable medium and executable by at least one processor according to an embodiment of the system described herein.

According to at least one embodiment, by using a thread of a container hypervisor in the storage system OS environment (e.g., Enginuity running Symm/K), it is possible for a Guest OS to operate in several modes. The container hypervisor thread may inherit the same number of CPU cores as that of the OS instance and may run as a single thread on those cores when active. However, since the container hypervisor is running as a thread, rather than being scheduled as an OS instance, as described elsewhere herein, other OS threads may also continue to run on other cores in the same SMP environment. The use of the OS scheduling algorithms (e.g., Symm/K) for scheduling the threads of the container hypervisors thus provide the ability to schedule fractions of CPU time on multiple cores for the Guest OS's. Furthermore, it is possible for the container hypervisor to allocate fewer virtual cores than physical cores available to the instance, and allow the Guest OS to operate SMP on those cores while still allowing other OS threads to operate with full CPU core resources, and to adjust the CPU allocation between Guest OS's and other threads. In an embodiment, in a VMAX system from Dell EMC, the granularity of the CPU time scheduling according to the system described herein may be on the order of 500 microseconds or less.

Figure 7:
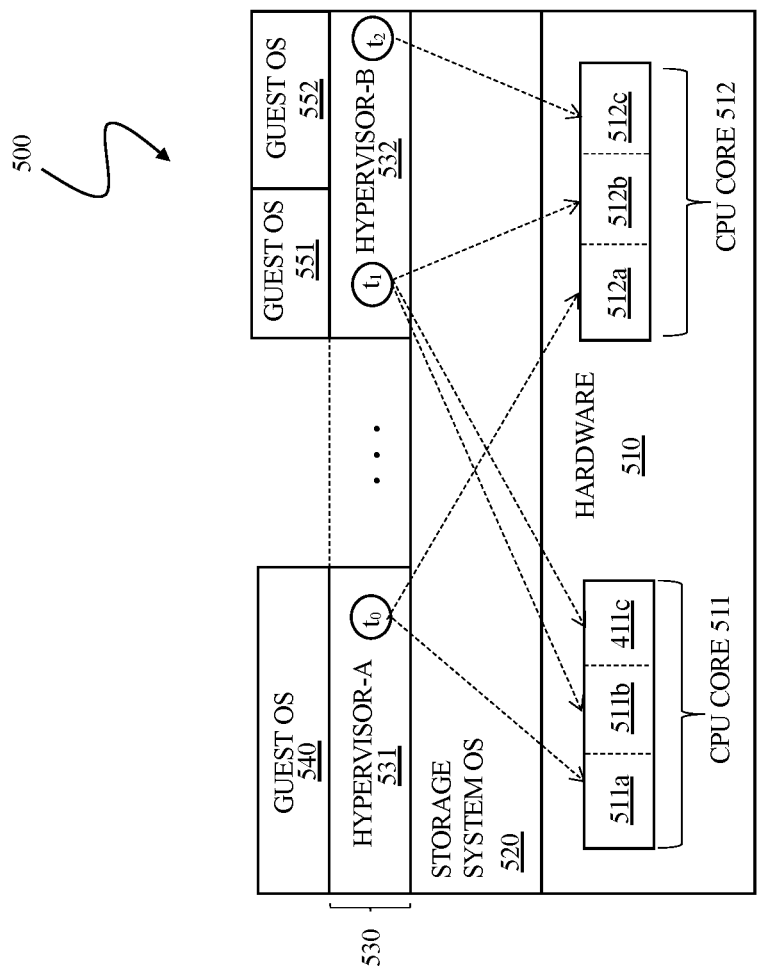
FIG. 7 is a schematic illustration showing a storage system with fractional SMP capabilities extended to one or more guest operating systems according to an embodiment of the system described herein.

Referring to FIG. 7, a schematic illustration shows a storage system 500 that is similar to the storage systems 100, 200 discussed elsewhere herein which may include a hardware layer 510 and a storage system OS layer 520. The storage system 500 has fractional SMP capabilities extended to one or more Guest OS's 540, 551, 552 according to an embodiment of the system described herein. The storage system 500 includes a container hypervisor layer 530, with a container hypervisor 531 (hypervisor-A) and a container hypervisor 532 (hypervisor-B) illustrated by way of example. The Guest OS's 540, 551 and 552 may be loaded using the container hypervisors 531, 532. The container hypervisors 531, 532 map virtual CPU cores to the physical CPU cores 511, 512 of the hardware layer 510. That is, in accordance with the system described herein, the one or more Guest OS's may only have access to a different number of available CPU cores (virtual CPU cores) that are available as physical CPU cores on the hardware 510. Through the use of the container hypervisors 531, 532 running as storage system OS threads t0, t1, and t2 (rather than being scheduled as storage system OS instances), at least one embodiment of the system described herein provides for the ability to schedule fractions of CPU time on multiple cores for one or more of the Guest OS's 540, 551, 552 according to the scheduling algorithms of the storage system OS components (e.g., Symm/K).

The scheduling of fractional CPU time on the physical CPU cores 511, 512 is shown schematically as fractions 511a-c and 512a-c of each of the CPU cores 511, 512. Each of the threads t0, t1, and t2 of the container hypervisors 531, 532 may operate in an SMP regime on multiple ones of the cores 511, 512 while allowing others of the threads to also operate with full CPU core resources. The system described herein provides for flexible control of physical CPU allocation between Guest OS's 540, 551, 552 without causing one or more of the Guest OS's 540, 551, 552 to become inactive due to resource overlaps. In this way, the Guest OS's 540, 551, 552 may run based on the threads of the container hypervisors 531, 532 using varying amounts of CPU time per CPU core in an SMP regime.

Consistent with other discussion herein, in at least one embodiment, different data services performed by the data storage system may be performed by applications, processes, or more generally, code, that execute in a Guest OS in a virtualized software environment. Each single data service may be performed by one or more threads of a container hypervisor. Multiple data services may simultaneously perform different functions, where such data services that execute simultaneously compete for needed resources from a finite set of resource of the storage system. Each of the hypervisors and the base OS of a storage system may schedule and run one or more threads performing processing for one or more data services that compete for resources of the storage system, including use of the CPU resources such as CPU cores of the system. Additionally, the resource requirements of the data services may be dynamic and may vary over time.

One approach may be to perform a static allocation of resources to different data services, and thus to the one or more threads of each such data service. With the static allocation, available resources may be partitioned among multiple threads and thus multiple data services. The particular resources allocated to a thread or data service may be dedicated for use solely by the thread or data service in order to guarantee a particular performance level without having to wait additional time to acquire necessary resources. However, such static allocation schemes are inflexible and may wastefully allocate resources to a data service even when the data service may not actually use all of the allocated resources. In this way, the allocated resources may be underutilized and may be unused at various points in time when the data service is idle or has a low workload. With a static allocation scheme, an allocated but unused first resource of a first data service is not available for use by another data service that may require the first resource. Additionally, in some systems, resources may be shared among the data services. Shared resources may be allocated to data services for use as needed. However, there may also be contention for a shared resource where 2 data services need the same shared resource at the same time.

Described in the following paragraphs are techniques that may be used to dynamically allocate CPU resources, such as CPU cores, to each of the threads of the data services according to the workloads of each of the threads at different times. Thus, for example, a particular thread may be allocated more CPU resources, such as more CPU cores, during a time when the thread has a relatively heavy workload than when the thread has a relatively light workload. In at least one embodiment, the techniques described in the following paragraphs provide for sharing resources among the data services of a storage system while ensuring that the varied different resources requirements of the data services as included in resources policies are met. Thus, each service may be provided with the resources needed to meet its target service levels.

In at least one embodiment, a cascading PID (proportional, integrative, adaptive) controller arrangement of two PID controllers is used to optimize the size of the shared free CPU resources pool and also optimize the amount and rate at which CPUs are deallocated and available to meet service level requirements of resource policies.

The foregoing and additional features of the techniques described herein are set forth in more detail in the following paragraphs.

The following paragraphs illustrate the use of the technique herein in connection with examples to a particular resource of a particular system, such as CPU resources of a data storage system. However, more generally, the techniques herein may be used with any suitable system resources, such as memory, and may also be more generally used in connection with any suitable system. Put another way, the techniques herein may be used in connection with providing resource sharing among multiple consumers that may simultaneously contend for the same set of resources.

In at least one embodiment, the data storage system may include multiple data services or applications that execute simultaneously and also simultaneously contend for resources of the system. The data services may include I/O related services for processing I/O operations received at the data storage system. For example, the I/O related services may include block I/O data services and/or file I/O data services. The I/O related services may include reading data from and/or writing data to the backend PDs in connection with servicing the received I/O operations. The data services may include data reduction services such as data deduplication, compression and decompression. The data services may include data replication services such as local replication of data within the same system (e.g., taking snapshots of a storage object), remote replication of data on a remote system for disaster recovery, performing local and/or remote data backups, various cloud data services, and data storage optimizations (e.g., dynamic automated movement of data between different performance tiers of PDs based on the workload of different data portions, where the data with the highest workload at a point in time is placed on the highest performance tier). The data services may also include servicing data management requests and operations, such as those issued over the control path. For example, the data management requests may be issued using a management application, a management API or a management CLI, where such requests are received by the data storage system for servicing.

Some of the data services, such as block and file I/O services, may have varied and dynamic resources needs that constantly change, for example, depending on the particular I/O workload of the system. Some of the data services may have a more predictable resource need based on a defined or established schedule. For example, a schedule may be defined for performing backups at particular times of the day or week, where the additional resources needs of the backup data service may be expected during such scheduled days and times.

In the following paragraphs, reference may be made to CPU resources. The CPU resources may be expressed in terms of a number of CPUs as well as cores of such CPUs. For simplicity, the following examples may refer to CPU resources in terms of a number of CPUs. However, CPU resources may also be expressed in other suitable units, such as cores. In connection with an embodiment in which a CPU has multiple cores, 100% utilization of a single CPU may denote utilization of all the cores of the single CPU. Proportionally, different percentage may denote utilization of one or more CPU cores. For example, in a single CPU including 2 cores, 50% utilization of the CPU may denote full utilization of a single core, 40% utilization of the CPU may denote 80% usage of a single CPU core, and the like.

The following examples refer to allocation of resources of a data storage on a single director board (e.g., 212a) or a single computing module (e.g., 220a) such as described elsewhere herein in connection with the FIGS. 2A and 2B. In such an embodiment, a single board may have its CPUs configured with multiple directors, such as FAs, DAs, EDSs (extended service adapters), an RA, and the like. In some embodiments, the directors on each board may be emulated instances of directors, for example, provided by executing code on CPUs that emulates or simulates the directors. Each such emulated director instance on a board may be configured, for example, to have a dedicated CPU for executing code of the particular director to perform processing by the director. In connection with configuring a board, the CPUs may be partitioned into non-shared or dedicated CPU resources allocated for use by the particular components of the board, and shared CPU resources. The shared CPU resources may be those remaining CPUs that are not so allocated to particular components and are rather available for sharing among other components on the same board. Once a particular application is done using a CPU resource that was obtained from the free pool of shared CPUs, the CPU resource may be returned to the free pool of shared CPUs for subsequent reuse as needed by another application. Thus the CPUs in the shared pool may be freely requested and allocated for use by different applications executing on CPUs of the board. In contrast, the CPUs designated as non-shared are not CPU resources available for request and use by an application. The shared CPU resources in this example may be further characterized as board local shared and also module local shared. CPU resources in the shared CPU resource pool are not shared or available for use by other components of a different board or module.

To further illustrate, assume there are 20 CPUs on the same module or board. A first portion of the 20 CPUs are designated as shared and included in the shared CPU resource pool, and the remaining portion of the 20 CPUs are designated as non-shared and are directly attached or dedicated for use by a service, application or component. For example, software of an emulated director, such as an FA, needs one or more dedicated CPUs. Thus, for example, 12 of the 20 CPUs may be non-shared and allocated for dedicated use by the different emulated directors configured on a board with the remaining 8 CPUs available for shared use among the different threads, processes and applications that may execute on components of the same board. The remaining 8 shared CPUs may be allocated, for example, to different threads of a particular application as the CPU demand by the application may increase. For example, one or more of the 8 free shared CPUs may be allocated for use by a thread of service or application during a burst of increased heavy workload, such as when the storage system receives a large burst of I/Os from one or more hosts resulting in an increase in I/O workload for a time period. In this case, for example, additional CPUs from the shared pool of 8 CPUs may be allocated for use by one or more threads in connection with servicing the I/Os. The one or more threads may perform various I/O services, such as block I/O services or file I/O services. The one or more threads may be included in code of an emulated director, such as an FA or a DA. For example, additional CPUs may be allocated to threads of a DA to read data from PDs and/or writing data to PDs in connection with servicing the I/Os or threads of an FA that receives the large burst of I/Os. Thus, different applications, services or components executing simultaneously may be in contention for use of the shared resources. When there is an insufficient number of CPUs available in the shared pool when needed by a thread of an application to service the increased I/O workload, the thread needs to wait for the additional CPUs from the shared CPU pool to become available.

An embodiment may use the techniques herein in connection with providing a mechanism to share resources such as the shared CPU resources of the board among the different applications, services or components of the board while ensuring resources are allocated or assigned to meet specified resource expectations, such as those set forth in resources policies. As noted above, at least one embodiment of the techniques herein may use multiple PID controllers included in a cascaded arrangement. Before discussing the particular PID controllers and the cascaded arrangement used in connection with the techniques herein, following is an initial discussion of a PID controller.

A proportional-integral-derivative controller, also known as a PID controller or three-term controller, is a control loop mechanism employing feedback that is widely used in industrial control systems and a variety of other applications requiring continuously modulated control. Although PID controllers are generally known in the art, a brief description is provided herein in the following paragraphs.

A PID controller is a feedback loop control design used in a variety of different applications to achieve and maintain a desired set point value. PID controller algorithms and models may be used to quickly and efficiently adjust to changing inputs and stay at the desired set point.

A PID controller continuously calculates an error value e(t) as the difference between a desired setpoint (SP) and a measured process variable (PV) and applies a correction based on proportional, integral, and derivative terms (denoted P, I, and D respectively), hence the name. In practical terms it automatically applies accurate and responsive correction to a control function. The PID controller generally uses the three control terms of proportional P, integral I and derivative D influence on the controller output to apply accurate and optimal control.

Figure 8:
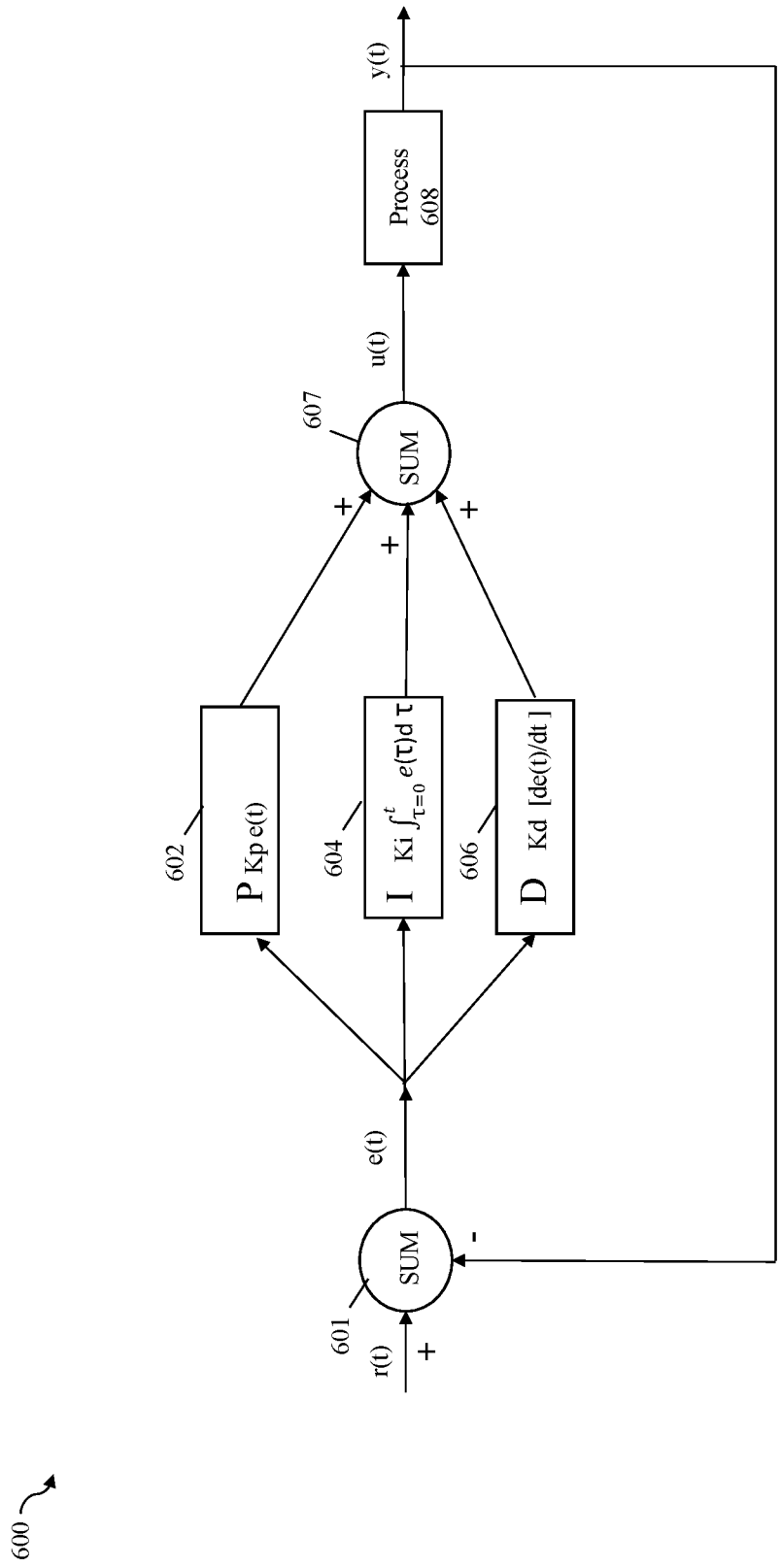
FIG. 8 is an example illustrating a PID controller that may be used in an embodiment in accordance with the techniques herein.

The block diagram of FIG. 8 illustrates the principles of how these P, I and D terms may be generated and applied. The example 600 illustrates a controller, which continuously calculates an error value e(t) as the difference between a desired setpoint SP=r(t) and a measured process variable PV=y(t). In the example 600, the foregoing difference that is e(t) may be computed by treating y(t) as a negative value and adding (601) −y(t) to +r(t) denoted as a positive value.

A correction or adjustment may be applied based on the 3 P (602), I (604) and D (606) control terms. The controller attempts to minimize the error over time by adjustments of a control variable u(t) to a new value determined by a weighted sum (607) of the control terms, P, I and D.

In connection with the PID controller or model, the term Pi 602 is proportional to the current value of the SP–PV error e(t). For example, if the error is large and positive, the control output will be proportionately large and positive, taking into account the gain factor "K". Using proportional control alone will result in an error between the setpoint and the actual process value, because it requires an error to generate the proportional response. If there is no error, there is no corrective response.

In connection with the PID controller or model, the term I 604 accounts for past values of the SP–PV error and integrates them over time to produce the I term. For example, if there is a residual SP–PV error after the application of proportional control, the integral term seeks to eliminate the residual error by adding a control effect due to the historic cumulative value of the error. When the error is eliminated, the integral term will cease to increase. This will result in the proportional effect diminishing as the error decreases, but this is compensated for by the growing integral effect.

In connection with the PID controller or model, the term D 606 is a best estimate of the future trend of the SP–PV error, based on its current rate of change. It is sometimes called "anticipatory control", as it is effectively seeking to reduce the effect of the SP–PV error by exerting a control influence generated by the rate of error change. The more rapid the change, the greater the controlling or dampening effect.

The balancing of the different effects of the P, I and D terms may be achieved by a process known as loop tuning to produce the optimal control function for the particular application or use. Loop tuning may include determining suitable values for the tuning parameters (also sometimes referred to as coefficients or constants) Kp, Ki and Kd for each control application, as they depend on the response characteristics of the complete loop external to the controller. Any suitable technique known in the art may be used to determine values for the tuning constants Kp, Ki and Kd. For example, initial values for the tuning constants may be provided. Typically, the initial values may then be refined, or tuned, for example, by introducing one or more setpoint changes and observing the system responses produced by the process 608.

The overall control function u(t) may be expressed as in EQUATION 1 below:

$$u(t)=Kp\ e(t)+Ki\int_{\tau=0}^{t}e(\tau)d\tau+Kd[de(t)/dt] \qquad \text{EQUATION 1}$$

where:
u(t) is the controller output, such as an adjustment to be made to achieve and maintain the desired set point;
Kp e(t) is the P term 602;
Ki e(τ)d τ is the I term 604;
Kd [de(t)/dt] is the D term 606;
t is point in time, such as a current point in time;
τ is the variable of integration in the I term that takes on the values from 0 through time t; and
Kp, Ki and Kd are the constants noted above and, in at least one embodiment, are non-negative coefficients, respectively, for the P, I and D terms of the controller functions or models of the PID controllers used in connection with the techniques herein and described in more detail elsewhere herein.

During operation, the PID controller 600 outputs a value for u(t) at a point in time t which is provided as an input to the controlling process 608. The process 608 may, for example, make an adjustment to the system based on u(t) and then obtain an observed or measured value y(t). Based on the difference between the measured value y(t) and the setpoint or target value r(t), an error e(t+1) is determined and provided as an input to the next iteration or time period t+1. In this manner, the PID controller 600 may make adjustments based on the output or control variable u(t) for several successive time periods in attempts to stabilize the system and achieve the desired set point. As other conditions in the system may change which result in further changes to the observed or measured y(n) at some future time period n, the PID controller process 608 may then further make additional changes or adjustments based on the control variable u(n) in order to meet the set point or target condition denoted by r(t). Generally, the PID controller 600 provides for regulating and dampening oscillations of the successive observed values for y(t) whereby values for the error e(t) and also y(t) converge to meet the desired target or set point r(t).

As described in more detail below, in at least one embodiment in accordance with the techniques herein two PID controllers may be used in combination to provide cascaded PID control. In cascaded PID control in an embodiment in accordance with the techniques herein, there are two PIDs arranged with one PID controller generating an output that is, in turn, provided as an input to the other PID controller.

Figure 9:
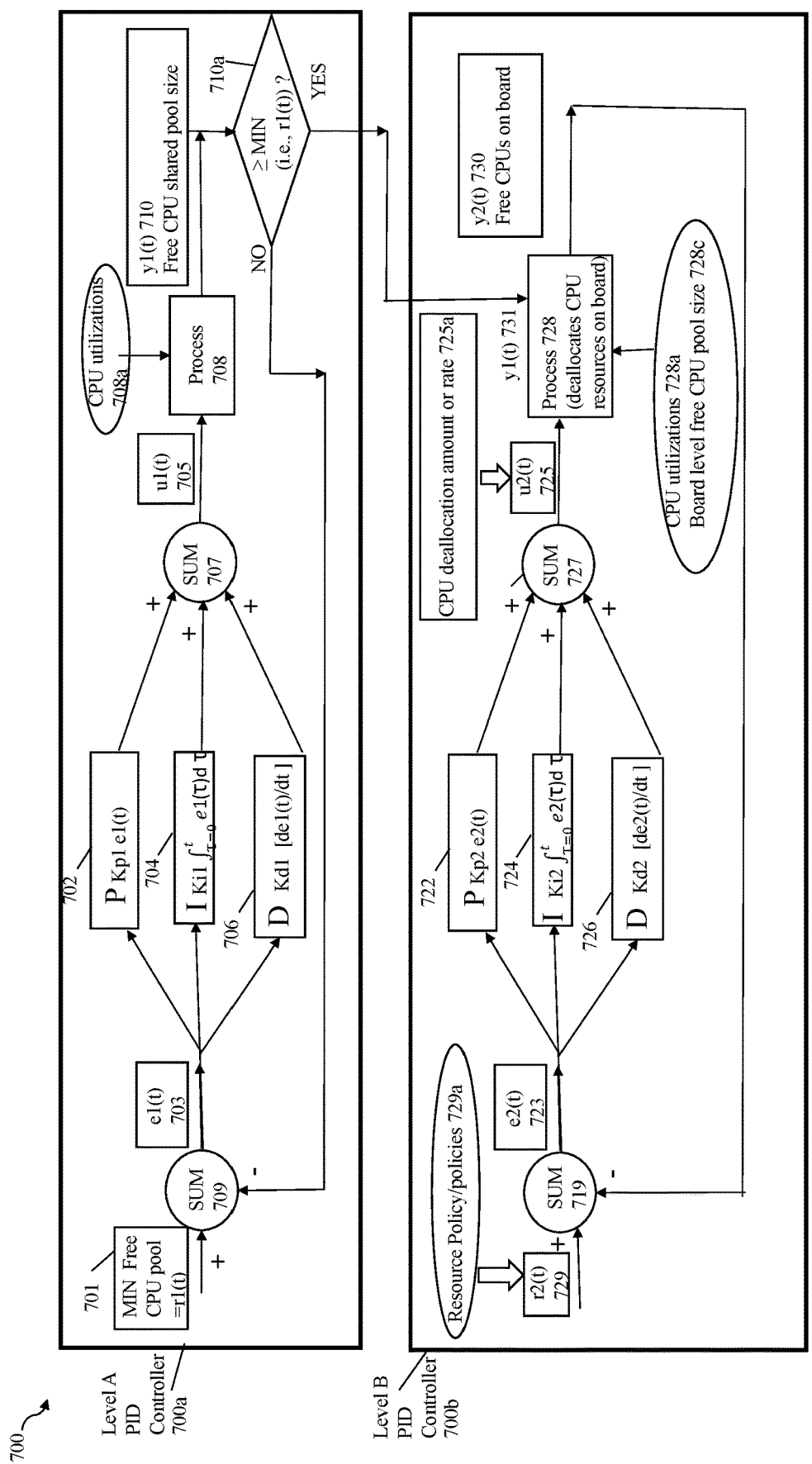
FIG. 9 is an example illustrating cascading PID controllers that may be used in an embodiment in accordance with the techniques herein.

Referring to FIG. 9, shown is an example arrangement of two PID controllers in a cascaded arrangement in at least one embodiment in accordance with the techniques herein.

The example 700 includes a first level A PID controller 700a (also sometimes referred to as PID controller A) and a second level B PID controller 700b (also sometimes referred to as PID controller B). The first level A PID controller 700a may be configured to monitor the current measured or observed size of the free CPU pool of shared CPU resources (i.e., Free CPU shared pool size) for the board. When the current size of the free CPU pool of shared CPU resources is greater than or equal to a minimum (MIN) threshold or low water mark, the current size of the free CPU pool of shared CPU resources is then provided as an input to the second level B PID controller 700b.

The first level A PID controller 700a may represent a controller model that operates in a general manner as discussed above, such as in connection with FIG. 8. The elements 709, 702, 704, 706, 707, and 708 of FIG. 9 may be similar to the elements 601, 602, 604, 606, 607 and 608 of FIG. 8. However, the first level A PID controller 700a operates using different parameters and variables customized for the particular use with the techniques herein. The element 701 may denote the MIN free CPU pool size threshold of the free CPU share pool size for the board. Thus, MIN is the set point or target value r1(t) (analogous to r(t) as in FIG. 8). The element 710 y1(t) (analogous to y(t) of FIG. 8) is the measured or observed size of the free CPU shared pool for the board. The error e1(t) 703 may be calculated by 709 as the difference between the MIN 701 and the current measured or observed free CPU shared pool size 710 (e.g., e1(t)=r1(t)−y1(t)). The elements 702, 704 and 706 may correspond, respectively, to the P, I and D terms of the controller 700a. It should be noted that the parameters, coefficients or constants of Kp1 in the P term 702, Ki1 in the I term 704, and Kd1 in the D term 706 may be selected or determined for the particular controller 700a in any suitable manner. The values for such parameters may be different from values of the parameters Kp2, Ki2, and Kd2 used in connection with, respectively, the P term 722, I term 724, and D term 726 of the second level B PID controller 700b. The particular values used for the parameters may be determined specifically for each particular controller 700a, 700b.

The value u1(t) 705 (e.g., analogous to u(t) of FIG. 8) denotes the adjustment or correction generated as a result of the P term 702, I term 704 and D term 706. The value u1(t) 705 may be provided as an input to the process 708 that may perform one or more corrective actions based on the value 705, where the one or more corrective actions may be taken in order to facilitate the measured or observed value y1(t) 710 of the free CPU shared pool size for the board meeting the MIN level 701. Generally, the process 708 may take any suitable action based on the value u1(t) 705. In at least one embodiment, the value u1(t) 705 may denote an adjustment or amount, such as amount of CPU resources, by which the free CPU shared pool size should be adjusted to facilitate meeting the MIN level 701. For example, assume that the free CPU shared pool size 710 is 2 denoting 2 free CPUs in the shared CPU pool for the board, and assume that MIN=5. In this case, the error value e1(t) 703=3. For one particular iteration, the PID terms, respectively 702, 704 and 706, may result in a value for u1(t) 705=1, denoting that the process 708 should take one or more responsive actions that result in an increase or adjustment to the number of CPUs in the free CPU shared pool size by 1 for this particular iteration of feedback processing by the controller 700a. In at least one embodiment, the process 708 may also receive as an input the CPU utilizations 708a that may indicate a % utilization level of each CPU in the shared CPU pool. The process 708 may use the input 708a, for example, to determine a possible action to take to increase the free CPU shared pool size by 1 CPU. For example, the input 708a may indicate that CPU A in the shared pool has a utilization of 10% and that CPU B in the shared pool has a utilization of 10%. The CPU A may be used by the thread A of application A, and the CPU B may be used by the thread B of the application B. The process 708 may perform processing that relocates the threads A and B to execute on the same CPU, such as CPU A. As a results, the shared CPU B is now free and added to the free CPU shared pool. Subsequently, after the foregoing is performed by the process 708, the resulting value for the free CPU shared pool size 710 is increased by 1.

The element 710a may denote the testing performed regarding the current observed or measured free CPU shared pool size, y1(t) 710. As denoted by 710, if the value y1(t) of the free CPU shared pool size is greater than or equal to the setpoint MIN 710, 710a evaluates to true or yes and the current vale for 710 is provided as the input 731 to the second level B PID controller 700b. Otherwise, if 710a evaluates to no or false, the value 710 is not provided as the input 7310 to the controller 700b and is alternatively provided as a feedback input into 709.

As a variation, in at least one embodiment, the process 708 may take no corrective action or adjustment. In such an embodiment, the level A PID controller 700a may operate in a monitoring mode to just monitor the changes in measured or observed sizes of the free CPU shared pool 710 at various points in time. Over time, the size of the free CPU shared pool will decrease as shared CPUs are allocated to various applications or threads, and will increase as various applications or threads return any allocated shared CPUs to the pool. Thus the free CPU shared pool size for the board experiences changes even without the process 708 taking any additional corrective action when needed to increase the size of the free CPU shared pool for the board.

The second level B PID controller 700b may optimize the rate at which CPUs are deallocated and available to meet specified target levels for applications or services, where the target levels may be included in one or more resource policies 729a. Thus, the second level B PID controller 700b may generally perform CPU deallocations in accordance with the one or more specified resource policies 729a. The second level B PID controller 700b may receive inputs including the current size of the free CPU pool of shared CPU resources (e.g., received from the first level A PID controller 700a and denoted as input 731 y1(t)), a total size denoting the CPU resources on the board that are free 728c (i.e., board level free CPU pool size), and CPU utilizations 728a (e.g., a % utilization per CPU for all CPUs on the board).

The second level B PID controller 700b may represent a controller model that operates in a general manner as discussed above, such as in connection with FIG. 8. The elements 719, 722, 724, 726, 727, and 728 of FIG. 9 may be similar to the elements 601, 602, 604, 606, 607 and 608 of FIG. 8. However, the second level B PID controller 700b operates using different parameters and variables customized for the particular use with the techniques herein. The element 729 may denote the various CPU resource levels for different applications, where the CPU resource levels or requirements are included in the resource policies 729a. Thus, the CPU resource levels or requirements of the policies 729a may be used to determine the set point or target value r2(t) (analogous to r(t) as in FIG. 8). The element 730 y2(t) (analogous to y(t) of FIG. 8) is the measured or observed size of the free CPU pool for the board (i.e., board level free CPU pool size). The size denoted by 730 includes free CPUs that are designated as shared and also non-shared or dedicated. Thus, the size 730 may denote the total number of CPUs on the board that currently have a 0% utilization such as with no threads or applications executing thereon. The size 730 may include CPUs that are non-shared in that they may be assigned to an application for the application's dedicated use. However, the application may not currently be using the CPU.

The error e2(t) 723 may be calculated by 719 as the difference between a setpoint determined using one or more CPU resource levels or requirements of the policies 729a and the current measured or observed board level free CPU pool size 730 (e.g., e2(t)=r2(t)−y2(t)). The elements 722, 724 and 726 may correspond, respectively, to the P, I and D terms of the controller 700b. It should be noted that the parameters, coefficients or constants of Kp2 in the P term 722, Ki2 in the I term 724, and Kd2 in the D term 726 may be selected or determined for the particular controller 7002 in any suitable manner. The values for such parameters may be different from values of the parameters Kp1, Ki1, and Kd1 used in connection with, respectively, the P term 702, I term 704, and D term 706 of the first level A PID controller 700a. The particular values used for the parameters may be determined specifically for each particular controller 700a, 700b.

The value u1(t) 705 (e.g., analogous to u(t) of FIG. 8) denotes the adjustment or correction generated as a result of the P term 702, I term 704 and D term 706. The value u2(t) 725 may be provided as an input to the process 728 that may perform one or more corrective actions based on the value 725, where the one or more corrective actions may be taken in order to facilitate the measured or observed value y2(t) 730, denoting the measured or observed board level free CPU pool size meeting the set point 729 determined using the one or more resource policies 729a.

Generally, the process 728 may take any suitable action based on the value u2(t) 725. In at least one embodiment, the value u2(t) 725 may denote an adjustment or amount, such as amount of CPU resources, by which the board level free CPU pool size should be adjusted to facilitate meeting the set point 729. The process 728 may make adjustments such as relocating threads for execution such as described in connection with the process 708 above. The process 728 may make such relocations with respect to not only CPUs of the shared pool, but in general with respect to all CPU resources of the board. For example, assume that the board level free CPU shared pool size 731 is 1 denoting 1 free shared CPU on the board. Assume that a first application A is executing and is experiencing an increase in workload. The application A may currently be assigned one CPU and, based on its current workload and its corresponding resource policy 729a, the application A will need an additional 2 CPUs to meet its specified service level. For example, the resource policy for application A may specify different CPU resource level requirements for different observed workloads for application A in order to maintain a particular service level. Thus, 2 more CPUs need to be allocated to application A for its use. However, there is only 1 free CPU in the shared CPU pool (731) for the board, and also there is only 1 free CPU on the entire board (as indicated by 728c). In this case, the error value e2(t) 723=1. For one particular iteration, the PID terms, respectively 722, 724 and 726, may result in a value for u2(t) 725=1, denoting that the process 728 should take one or more responsive actions that result in an increase or adjustment to the number of free CPUs on the board by 1 for this particular iteration of feedback processing by the controller 700b.

In response to u2(t) 725=1, the process 728 may perform processing to further deallocate another CPU on the board for use by the application A. In at least one embodiment, the process 728 may also receive as an input the CPU utilizations 728a that may indicate a % utilization level of each CPU on the board. The process 728 may use the input 728a, for example, to determine a possible action to take to obtain an additional free CPU. For example, the input 728a may indicate that CPU X is a dedicated CPU for use by application X and CPU X has a utilization of 10%. Currently thread X of the application X is executing on the CPU X resulting in the utilization of 10%. The input 728a may also indicate that CPU Y is a dedicated CPU for use by application Y and CPU Y has a utilization of 10%. Currently thread Y of the application Y is executing on the CPU Y resulting in the utilization of 10%. Despite the CPUs X and Y being non-shared or dedicated CPUs allocated for use respectively by the applications X and Y, the process 728 may perform processing that temporarily relocates the threads X and Y to execute on the same CPU, such as CPU X. As a result, the shared CPU Y is now free and deallocated. Subsequently, CPU Y may be temporarily allocated for use by the application A during its heavy workload without adversely affecting the performance or service levels of the applications X and Y. Once the application A's high workload has decreased, CPU Y may be reallocated or reassigned to application Y where thread Y may then be relocated to CPU Y to continue execution. The process 728 may perform such temporary reallocation or assignment of non-shared CPU thereby overriding a dedicated allocation or assignment, such as with respect to the overriding the dedicated allocation or assignment of the CPU Y to application Y.

Thus, the second level B PID controller 700b may determine a CPU deallocation amount or rate 725a in accordance with one or more resource policies 729a. The one or more resource policies 729a may specify CPU resource policies for different services or applications executing on the system and the particular resource levels expected for the different services or applications. The one or more resource policies 729a may include one or more CPU resource levels used to determine the target or desired level of free CPU resources for applications, and thus the board, for a particular point in time depending on the particular applications or services executing in the system. Such applications or services may require allocation or assignment of CPU resources from the shared CPU resource pool of the board. In the event that there is insufficient shared CPU resources available, the process 728 may also perform additional processing with respect to all CPUs on the board in order to obtain the necessary CPU resources for the particular point in time without adversely impacting other applications that may be using the CPU resources. As described above, the process 728 may take suitable actions including relocating threads of applications on CPUs that are not included in the free CPU shared pool. Generally, the process 728 may also make temporary CPU deallocations for CPUs designated as non-shared (e.g., currently assigned or allocated for dedicated use by a particular application). Any such deallocations of non-shared CPUs may also be done in accordance with CPU resource target levels of resource policies 729a. For example, such a deallocation and temporary reallocation of a non-shared or dedicated CPU, such as CPU Y in the above example, should not adversely impact the performance of the application Y using the CPU Y or currently allocated CPU Y. Whether the temporary reallocation of the CPU Y from the application Y should be performed may be based on information in the resource policy for application Y. For example, the resource policy may indicate that application Y has a much lower priority and much lower service level than application A to which the CPU Y is assigned. Additionally, the process 728 may determine that the currently low workload of the application Y will not be adversely impacted by the temporary relocation to CPU X. The resource policy for application Y may indicate that, for the current low workload, application Y may have CPU resource requirements of only 40% utilization of a single CPU, where application Y may be temporarily relocated to CPU X that is shared with the application X. In a similar manner, the resource policy for application X may specify CPU resource requirements of only 40% of a single CPU and may therefore be combined with application Y for execution on the same CPU X.

In at least one embodiment, the value for MIN 701 may be increased or decreased in order to, respectively, increase or decrease the desired minimum size of the free CPU shared pool. In at least one embodiment, the value for MIN 701 may be changed to reflect any predicted or expected change in CPU resource requirements of the applications or services on the system. For example, a backup application may perform backups based on scheduled dates and times. At the scheduled dates and times, it may be expected that additional CPU resources may be needed by the backup application. As such, within a specified amount of time prior to a scheduled backup, the value for MIN 701 may be increased in anticipation of the additional CPU resources that will be needed by the backup application. The foregoing of scheduled backups are known future points in time when CPU resource demand by a particular application is expected to increase. The techniques herein may be used to provide for increasing the shared CPU resource in the pool for use by the backup application prior to the point in time when the additional CPU resources are expected to be needed.

In at least one embodiment, other techniques may be used to detect and predict changes in workloads of various applications. Thus, the value for MIN 701 may be increased where possible prior to the predicted time period of increased workload; and the value for MIN 701 may be decreased where possible prior to the predicted time period of decreased workload. Additionally, the value for MIN 701 may be increased responsive to detecting a period of increased workload; and the value for MIN 701 may be decreased responsive to detecting a period of decreased workload.

In the above examples, the CPU deallocation amount 725a is described as an integer quantity. As a variation, an embodiment may specify a CPU deallocation rate for 725a that indicates an amount of CPUs to deallocate within a period of time. As the system workload increases and thus gets "busier", the deallocation rate may increase since more additional free CPUs are needed. As the system workload decreases, the deallocation rate may decrease since less additional free CPUs are needed.

Referring to FIG. 10, shown is an example 900 of information that may be included in one or more resource policies 910 for applications or services in an embodiment in accordance with the techniques herein. The resource policies 910 include the following columns of information: application or service 912, service level and priority 914, workload 916 and CPU requirements 918. Generally, the CPU requirements 918 may denote minimum CPU resource requirements. In at least one embodiment, the various applications may have associated service levels and priorities (914) denoting the relative importance of a particular application with respect to other applications. In one embodiment, there may be predetermined service levels and priorities. The predetermined service levels may be (from highest service level to lowest service level): diamond, platinum, gold, silver, and bronze. The priority specified for an application may be one of a predetermined set of priorities. For example he predetermined priorities (from highest to lowest priority) may be: 1, 2, 3, 4, 5.

The row 922 indicates the CPU resource requirements for application A. In particular the row 922 indicates that application A (912) has a platinum service level and is a priority 1 application. The row 922 indicates that when the workload of application A is below A1, the CPU resource requirement is 1 CPU; when the workload of application A is between A1 and A2, the CPU resource requirement 2 CPUs; and when the workload of application A is more than A2, the CPU resource requirement is 3 CPUs.

The row 924 indicates the CPU resource requirements for application B. In particular the row 924 indicates that application B (912) has a silver service level and is a priority 4 application. The row 924 indicates that independent of workload, and thus for any workload level, the CPU resource requirement is 1 CPU.

The row 926 indicates the CPU resource requirements for application C. In particular the row 926 indicates that application C (912) has a bronze service level and is a priority 5 application. The row 926 indicates that independent of workload, and thus for any workload level, the CPU resource requirement is 40% of a CPU.

The information in the resource policies 910 may be used as described in connection with elements 729 and 729a of FIG. 9 to determine CPU resource levels and a CPU deallocation amount or rate.

Figure 11:
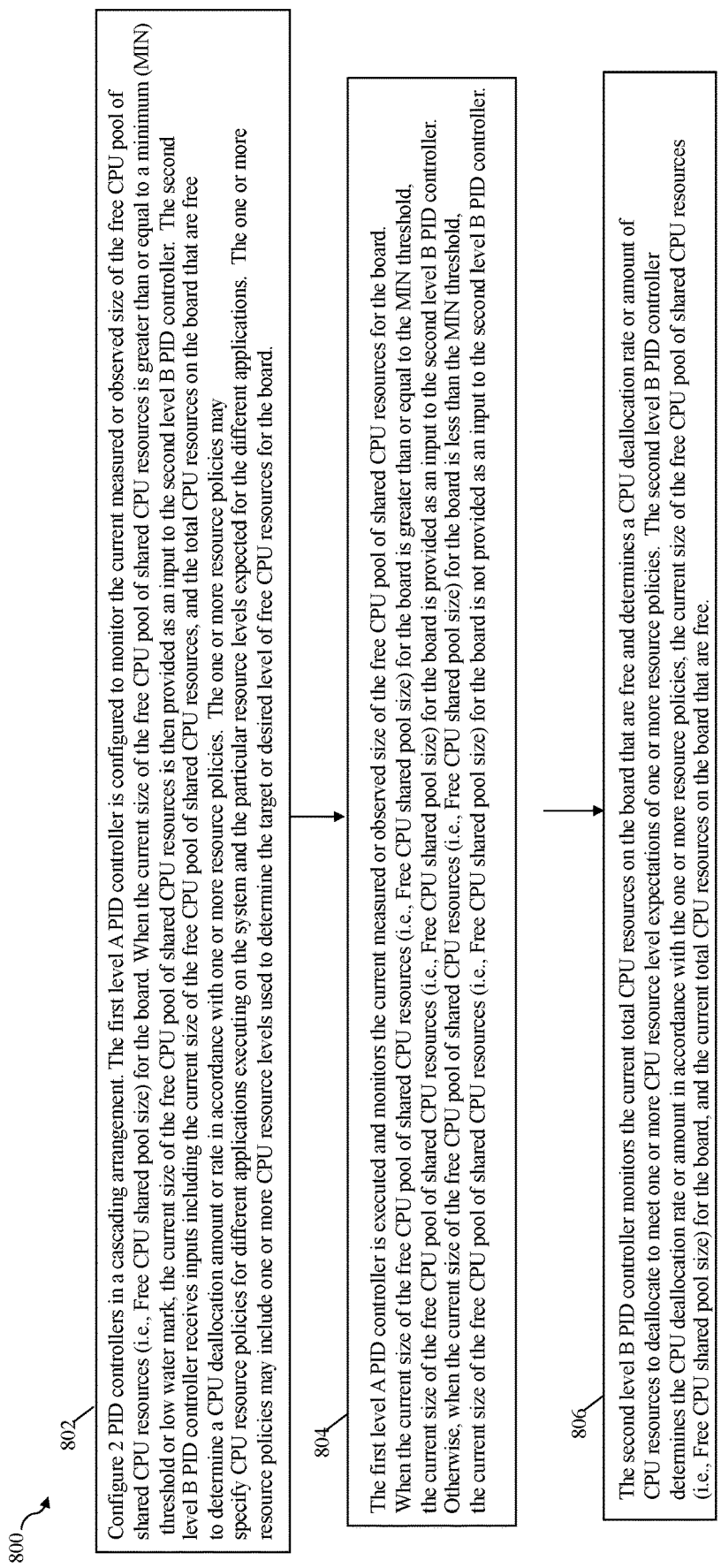

Referring to FIG. 11, shown is a flowchart of processing steps that may be performed in an embodiment in accordance with the techniques herein. The flowchart 800 summarizes processing described above.

At the step 802, processing may be performed to configure 2 PID controllers in a cascading arrangement. The first level A PID controller is configured to monitor the current measured or observed size of the free CPU pool of shared CPU resources (i.e., Free CPU shared pool size) for the board. When the current size of the free CPU pool of shared CPU resources is greater than or equal to the MIN threshold or low water mark, the current size of the free CPU pool of shared CPU resources is then provided as an input to the second level B PID controller. The second level B PID controller receives inputs including the current size of the free CPU pool of shared CPU resources, and the total CPU resources on the board that are free to determine a CPU deallocation amount or rate in accordance with one or more resource policies. The one or more resource policies may specify CPU resource policies for different applications executing on the system and the particular resource levels expected for the different applications. The one or more resource policies may include one or more CPU resource levels used to determine the target or desired level of free CPU resources for the board. From the step 802, control proceeds to the step 804.

At the step 804, the first level A PID controller is executed and monitors the current measured or observed size of the free CPU pool of shared CPU resources for the board. When the current size of the free CPU pool of shared CPU resources (i.e., Free CPU shared pool size) for the board is greater than or equal to the MIN threshold, the current size of the free CPU pool of shared CPU resources (i.e., Free CPU shared pool size) for the board is provided as an input to the second level B PID controller. Otherwise, when the current size of the free CPU pool of shared CPU resources (i.e., Free CPU shared pool size) for the board is less than the MIN threshold, the current size of the free CPU pool of shared CPU resources (i.e., Free CPU shared pool size) for the board is not provided as an input to the second level B PID controller. From the step 804, control proceeds to the step 806.

At the step 806, the second level B PID controller monitors the current total CPU resources on the board that are free and determines a CPU deallocation rate or amount of CPU resources to deallocate to meet one or more CPU resource level expectations of one or more resource policies. The second level B PID controller determines the CPU deallocation rate or amount in accordance with the one or more resource policies, the current size of the free CPU pool of shared CPU resources (i.e., Free CPU shared pool size) for the board, and the current total CPU resources on the board that are free.

It should be appreciated that while the steps are described herein as being performed serially and in a certain order, one or more these steps or portions thereof, may be performed concurrently and/or in a different order than illustrated and as described herein.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of allocating resources in a system comprising:
    monitoring, using a first proportional-integral-derivative (PID) controller, a size of a pool of free shared resources of a first type;
    responsive to determining that the size of the pool of the free shared resources of the first type is greater than or equal to a minimum threshold, providing the size of the pool of free shared resources as an input to a second PID controller;
    monitoring, using the second PID controller, a total amount of resources of the first type that are available;
    determining, using the second PID controller and in accordance with one or more resource policies for one or more applications, a deallocation rate or amount for resources of the first type;
    deallocating, using the second PID controller and in accordance with the deallocation rate or amount, one or more resources of the first type; and
    allocating a least a first of the one or more resources for use by a first of the one or more applications.

2. The method of claim 1, wherein the system is a data storage system.

3. The method of claim 1, wherein the first type of resources is memory.

4. The method of claim 1, wherein the first type of resources is CPU resources.

5. The method of claim 4, wherein the pool of free shared CPU resources denotes CPU resources of a single board that are available for use by any application executing on a CPU of the single board.

6. The method of claim 5, wherein the total amount of resources of the first type that are available denotes a total amount of CPU resources on the single board that are available.

7. The method of claim 6, wherein the total amount of CPU resources that are available includes first CPU resources of the pool of free shared CPU resources and includes second CPU resources that are allocated for dedicated use by one or more applications executing on one or more CPUs of the single board.

8. The method of claim 7, wherein the second CPU resources allocated for dedicated use by the one or more applications includes a first portion which are currently not in use by any of the one or more applications.

9. The method of claim 6, wherein the total amount of CPU resources on the single board that are available denotes a number of CPUs of the single board where each of the number of CPUs currently has a zero-percentage utilization.

10. The method of claim 1, further comprising:
    varying the minimum threshold at each of various points in time in accordance with an expected or predicted change in resource requirements of at least one application that consumes resources of the pool of free shared resources of the first type.

11. A non-transitory computer readable medium comprising code stored thereon that, when executed, performs a method of allocating resources in a system comprising:
    monitoring, using a first proportional-integral-derivative (PID) controller, a size of a pool of free shared resources of a first type;
    responsive to determining that the size of the pool of the free shared resources of the first type is greater than or equal to a minimum threshold, providing the size of the pool of free shared resources as an input to a second PID controller;
    monitoring, using the second PID controller, a total amount of resources of the first type that are available;
    determining, using the second PID controller and in accordance with one or more resource policies for one or more applications, a deallocation rate or amount for resources of the first type;
    deallocating, using the second PID controller and in accordance with the deallocation rate or amount, one or more resources of the first type; and
    allocating a least a first of the one or more resources for use by a first of the one or more applications.

12. The non-transitory computer readable medium of claim 11, wherein the system is a data storage system.

13. The non-transitory readable medium of claim 11, wherein the first type of resources is memory.

14. The non-transitory computer readable medium of claim 11, wherein the first type of resources is CPU resources.

15. The non-transitory computer readable medium of claim 14, wherein the pool of free shared CPU resources denotes CPU resources of a single board that are available for use by any application executing on a CPU of the single board.

16. The non-transitory computer readable medium of claim 15, wherein the total amount of resources of the first type that are available denotes a total amount of CPU resources on the single board that are available.

17. The non-transitory computer readable medium of claim 16, wherein the total amount of CPU resources that are available includes first CPU resources of the pool of free shared CPU resources and includes second CPU resources that are allocated for dedicated use by one or more applications executing on one or more CPUs of the single board.

18. A data storage system comprising:
a plurality of director boards, wherein each of the plurality of director boards includes a plurality of CPUs configured as a plurality of adapters;
a memory coupled to the plurality of director boards;
a computer readable medium comprising code stored thereon that, when executed, performs a method of allocating resources in the data storage system comprising:
monitoring, using a first proportional-integral-derivative (PID) controller, a size of a pool of free shared CPU resources on a first of the plurality of director boards;
responsive to determining that the size of the pool of the free shared CPU resources of the first director board is greater than or equal to a minimum threshold, providing the size of the pool of free shared CPU resources of the first director board as an input to a second PID controller;
monitoring, using the second PID controller, a total amount of CPU resources of the first board that are available;
determining, using the second PID controller and in accordance with one or more resource policies for one or more applications, a deallocation rate or amount for CPU resources of the first director board;
deallocating, using the second PID controller and in accordance with the deallocation rate or amount, one or more CPU resources of the first director board; and
allocating a least a first of the one or more CPU resources of the first director board for use by a first of the one or more applications.

19. The data storage system of claim 18, wherein the plurality of adapters includes a host adapter that exchanges data with one or more hosts connected to the data storage system.

20. The data storage system of claim 18, wherein the plurality of adapters includes a disk adapter that exchanges data with one or more physical storage devices.

21. The data storage system of claim 18, wherein the plurality of adapters includes a remote adapter that exchanges data with one or more remote data storage systems.

22. The data storage system of claim 18, wherein each of the plurality of adapters of said each director board are emulated using code that executes on one or more processors of one or more CPU resources of said each director board.

\* \* \* \* \*